(12) United States Patent
Hwang

(10) Patent No.: US 12,184,199 B2
(45) Date of Patent: Dec. 31, 2024

(54) SYNCHRONOUS BRIDGE RECTIFIER USING PLANAR SWITCHING ELEMENTS

(71) Applicant: Champion Microelectronic Corporation, Hsinchu (TW)

(72) Inventor: Jeffrey Hwang, Saratoga, CA (US)

(73) Assignee: Champion Microelectronic Corporation (TW)

( * ) Notice: Subject to any disclaimer, the term of this patent is extended or adjusted under 35 U.S.C. 154(b) by 231 days.

(21) Appl. No.: 17/858,005

(22) Filed: Jul. 5, 2022

(65) Prior Publication Data
US 2023/0054025 A1    Feb. 23, 2023

Related U.S. Application Data

(60) Provisional application No. 63/234,158, filed on Aug. 17, 2021.

(51) Int. Cl.
| H02M 7/00 | (2006.01) |
| H02M 1/00 | (2006.01) |
| H02M 7/219 | (2006.01) |

(52) U.S. Cl.
CPC ......... H02M 7/219 (2013.01); H02M 1/0083 (2021.05); H02M 7/003 (2013.01)

(58) Field of Classification Search
CPC .................................................. H02M 7/0003
See application file for complete search history.

(56) References Cited

U.S. PATENT DOCUMENTS

| 10,855,273 | B2 | 12/2020 | Li et al. |
| 2002/0117681 | A1 | 8/2002 | Weeks et al. |
| 2004/0130002 | A1 | 7/2004 | Weeks et al. |
| 2006/0145674 | A1 | 7/2006 | Shelton et al. |
| 2010/0059875 | A1* | 3/2010 | Sato ........................ H01L 24/40 |
| | | | 257/E23.079 |
| 2013/0241621 | A1 | 9/2013 | Forhgani-Zadeh et al. |
| 2014/0159685 | A1 | 6/2014 | Ito et al. |
| 2014/0185327 | A1 | 7/2014 | Shah |
| 2017/0170731 | A1 | 6/2017 | Marini et al. |
| 2017/0179834 | A1 | 6/2017 | Lin |
| 2018/0205309 | A1 | 7/2018 | Bleus et al. |
| 2019/0006954 | A1* | 1/2019 | Hwang ................. H02M 7/219 |
| 2019/0028094 | A1 | 1/2019 | Reusch et al. |
| 2019/0280605 | A1 | 9/2019 | Krzywinski et al. |
| 2019/0379374 | A1 | 12/2019 | Li et al. |
| 2020/0287499 | A1 | 9/2020 | Rice et al. |

* cited by examiner

Primary Examiner — Peter M Novak
(74) Attorney, Agent, or Firm — Derek J. Westberg, Esq.

(57) ABSTRACT

Asynchronous bridge rectifier comprises a monolithic die comprising plurality of planar switching elements, each having a control terminal and two controlled terminals. The bridge rectifier further comprises a plurality of controller integrated circuits mechanically attached to the monolithic die, wherein the controller integrated circuits are configured to sense voltage across the controlled terminals of the planar switching elements and to generate a drive signal at the control terminal of the planar switching elements to control opening and closing of the planar switching elements so as to be capable of rectifying an alternating current input signal to form a rectified direct current output signal.

18 Claims, 10 Drawing Sheets

SYNCHRONOUS BRIDGE RECTIFIER USING PLANAR SWITCHING ELEMENTS

This application claims priority of U.S. Provisional Application No. 63/234,158, filed Aug. 17, 2021, the entire contents of which are hereby incorporated by reference.

BACKGROUND OF THE INVENTION

The present invention relates to the field of synchronous bridge rectifiers and, more particularly, the present invention relates to synchronous bridge rectifiers, methods of operating synchronous bridge rectifiers, and components thereof.

A bridge rectifier converts an alternating current (AC) signal to a direct current (DC) signal. This process is also referred to as "rectification." Bridge rectifiers are commonly used in off-line power supplies that receive power from a sinusoidal AC input power source and provide a voltage-regulated DC output that can be used to power a load, such as an electronic device. While such power supplies often perform subsequent processing and transformation on the rectified DC signal, a bridge rectifier performs an essential function of converting the AC signal to a DC signal.

FIG. 1 illustrates a bridge rectifier circuit of the prior art. As shown in FIG. 1, a first diode $D_1$ has its cathode coupled to the cathode of a second diode $D_2$. The anode of the second diode $D_2$ is coupled to the cathode of a third diode $D_3$. The anode of the third diode $D_3$ is coupled to the anode of a fourth diode $D_4$. The cathode of the fourth diode $D_4$ is coupled to the anode of the first diode $D_1$. The node between the anode of the first diode $D_1$ and the cathode of the fourth diode $D_4$ provides a first input terminal for the AC source, while the node between the anode of the second diode $D_2$ and the cathode of the third diode $D_3$ provides a second input terminal for the AC source. The node between the cathode of the first diode $D_1$ and the cathode of the second diode $D_2$ provides a first output terminal for the DC signal, while the node between the anode of the third diode $D_3$ and the anode of the fourth diode $D_4$ provides a second output terminal for the DC signal. An AC input signal $V_{AC}$ is applied across the input terminals to produce a rectified DC output signal $V_{DC}$ across the output terminals.

FIG. 2 illustrates the AC sine wave input signal $V_{AC}$ and the rectified DC output signal $V_{DC}$. As shown in FIG. 2, the AC input signal $V_{AC}$ crosses above and below the zero volt level. The resulting pulsating DC output signal $V_{DC}$ remains above the zero volt level. The rectifier illustrated in FIGS. 1 and 2 is a full-wave rectifier, meaning that positive and negative portions of the AC input signal, above and below the zero volt level, are transformed to the output. Other types of rectifiers include half-wave rectifiers in which either the positive or negative half of the AC input is passed to the output, while the other half is blocked.

Use of diodes in the rectifier makes for a relatively simple design, however, the voltage drop across the diodes (approximately 0.7 volts), generates heat and diminishes efficiency. Therefore, what is needed is an improved bridge rectifier.

SUMMARY OF THE INVENTION

The present invention provides a synchronous bridge rectifier using planar switching elements. In an embodiment a synchronous bridge rectifier comprises a monolithic die comprising plurality of planar switching elements, each having a control terminal and two controlled terminals. The bridge rectified further comprises a plurality of controller integrated circuits mechanically attached to the monolithic die, wherein the controller integrated circuits are configured to sense voltage across the controlled terminals of the planar switching elements and to generate a drive signal at the control terminal of the planar switching elements to control opening and closing of the planar switching elements so as to be capable of rectifying an alternating current input signal to form a rectified direct current output signal.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
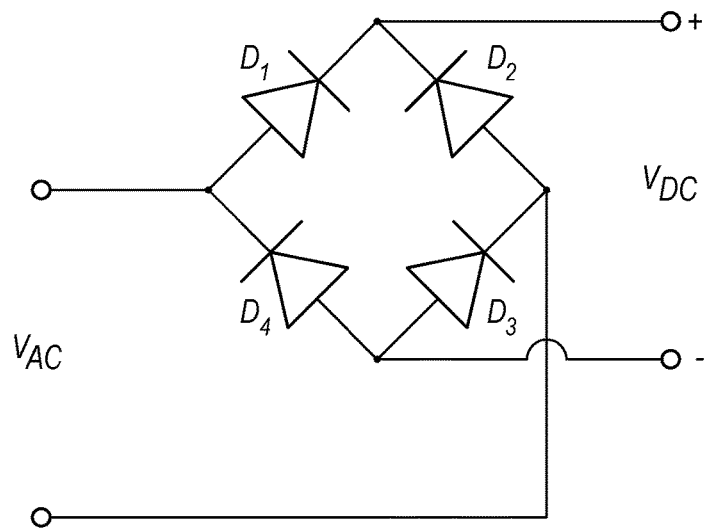
FIG. 1 illustrates a diode bridge rectifier circuit of the prior art.
Figure 2:
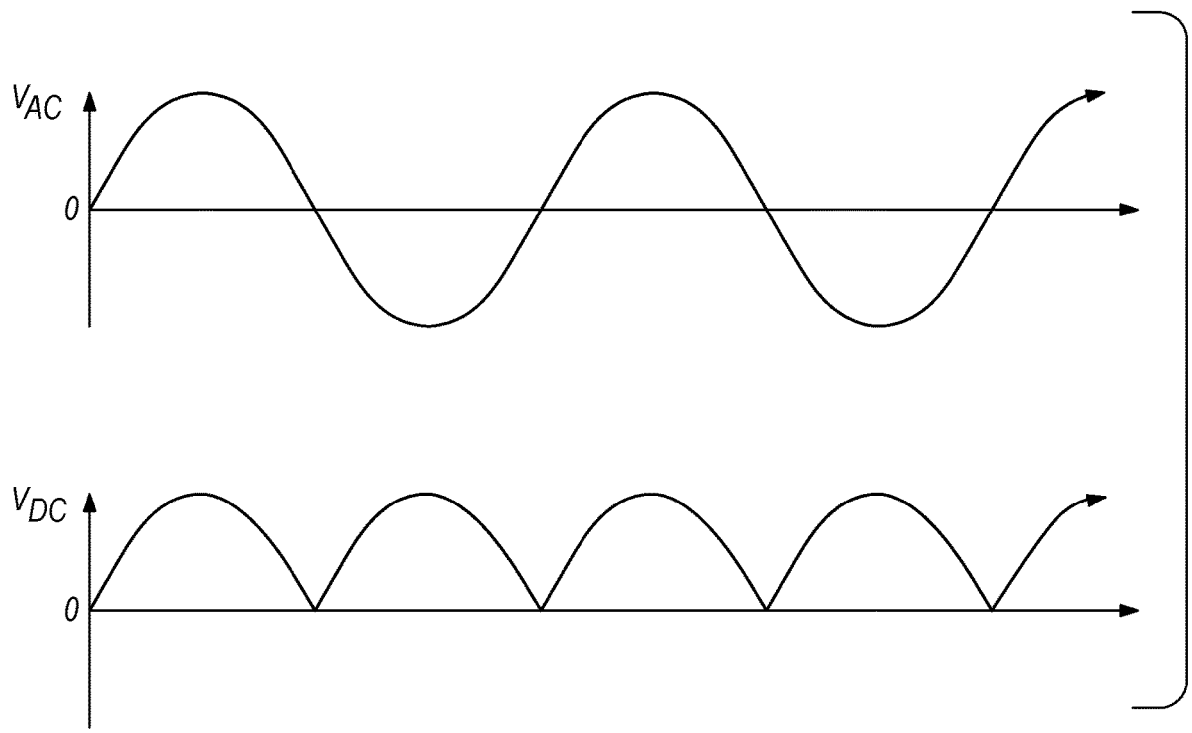
FIG. 2 illustrates an alternating-current sine wave voltage signal and a full-wave rectified sine wave voltage signal.

In accordance with an embodiment of the present invention, a synchronous bridge rectifier is provided in which the synchronously switched elements comprise planar transistors. For example, the switched elements may comprise high-electron-mobility transistors (HEMTs), such as gallium nitride (GaN) transistors. Such switched elements are "planar" in that they tend to occupy greater area per device than equivalent capacity "vertical" structures such as metal-oxide-silicon field-effect transistors (MOSFETs). In a preferred embodiment, the switched elements comprise GaN transistors; therefore, the switched elements are referred to as GaN transistors in the embodiments described herein. It will be understood, however, that the described GaN transistors can be replaced with any type of HEMT devices or any other type of planar devices, including but not limited to those comprised of silicon carbide, bipolar and germanium semiconductor materials.

Each switched element, such as a GaN transistor, is controlled by a corresponding dedicated controller circuit that senses voltage across the drain and source of the GaN transistor and, in response to the sensed voltage, controls the gate of the GaN transistor to turn the GaN transistor on and off at appropriate times in order to rectify an alternating current (AC) input signal of an AC source to form a direct current DC output signal.

Each controller circuit is preferably implemented as an integrated circuit (IC) equipped with a power supply for powering itself from the AC input signal. A capacitor coupled to each controller circuit serves as an energy reservoir to provide power to the controller circuit at times when the power supply of the controller circuit is unable to derive power from the AC input signal.

Each controller circuit preferably has exactly four terminals, including a gate terminal configured to control the gate of the corresponding GaN transistor, a drain terminal configured to be coupled to the drain of the corresponding GaN transistor, a source terminal configured to be coupled to the source of the corresponding GaN transistor and a supply terminal. The controller is configured to sense voltage across the drain and source of the corresponding GaN transistor for controlling switching of the GaN transistor. The controller is also configured to obtain power for powering the controller circuit from the AC input voltage across the drain and source terminals. The supply terminal is coupled to a capacitor for charging the capacitor and for receiving energy from the capacitor. The capacitor provides energy storage for powering the controller circuit when the AC source is not available for use by the power supply of the controller circuit.

In accordance with an embodiment, each controller circuit can compare a sensing signal that is representative of a drain-to-source voltage of the GaN transistor to a first reference voltage level for turning the GaN transistor off. This comparison can be performed by a first comparator of the controller. Each controller can also compare the sensing signal that is representative of the drain-to-source voltage of the GaN transistor to a second reference voltage level for turning the GaN transistor on. This comparison can be performed by a second comparator of the controller.

Each controller circuit preferably includes a gate driver for controlling the gate terminal of the corresponding GaN transistor switch. The gate drivers are configured to provide appropriate drive signals to the corresponding GaN transistors. For example, a gate drive signal generated by the gate driver is limited to a maximum level of approximately 5.5 volts DC. The controller circuits may include MOSFETs for implementing functions of the controller. Accordingly, the supply voltage level for the controller circuits can be, for example, 15 to 20 volts DC. Additional controller components may be provided, as described herein.

The combination of a controller circuit and GaN transistor (and possibly also the corresponding capacitor) is referred to herein as a "switching unit." Such a switching unit functions essentially as an "ideal diode." When combined, the controller circuit, its corresponding GaN transistor and capacitor preferably have exactly two terminals, namely, the drain and source terminals, so that each switching unit also has exactly these same two terminals. As such, an embodiment of the present invention also provides a diode replacement which can be used in a bridge rectifier as well as other diode applications. Such switching units can be used in parallel in order to increase their current-handling capacity. For example, two or more bridge rectifiers can be employed in parallel to provide rectified current to a large capacity power supply.

In an embodiment of a full-wave bridge rectifier, four controller circuits, each with corresponding GaN transistor and capacitor, are provided. Each of these four switching units can be identical to the others though connected together in a full bridge configuration. The switching units each preferably operate independently of the others without centralized control; however, the operation of each switching unit is synchronized to the AC input signal and thus operation of all of the switching units is synchronized to perform rectification of the AC input signal.

Because the controllers are each provided with a corresponding power supply, the rectifier lacks a centralized or external power supply. The rectifier also lacks a common ground node. Rather, each switching unit has its own voltage reference which corresponds to the source terminal of the GaN transistor. As such, no high side driver is needed (a high side driver is a control circuit capable of driving the gate of a transistor whose source terminal is not referenced to same ground as the control circuit).

In an embodiment, a four-transistor, monolithic integrated circuit die is provided. Such a monolithic integrated circuit die can include four GaN transistor switches. Therefore, such a monolithic integrated circuit die can be used in a full bridge rectifier. In a further embodiment, a bridge rectifier integrated circuit (IC) assembly, or "package," is provided. Such an IC assembly can include four controller circuits, each configured to control a corresponding GaN transistor. Each of the controller circuits can be implemented as a corresponding integrated circuit. For example, the controller integrated circuits can employ and comprise (MOSFETs). Four such controller integrated circuits can be physically mounted (i.e. mechanically attached) to the GaN transistor monolithic integrated circuit die (e.g., by being glued, epoxied or otherwise bonded). Each such controller integrated circuit can also be electrically connected to the gate, drain and source terminals of a corresponding GaN transistor switch of the GaN transistor monolithic integrated circuit die. The assembly or package can have, for example, exactly eight terminals or pins. These eight terminals can include the four terminals of the bridge rectifier (i.e. two AC input terminals and two rectified DC output terminals) and the four power supply terminals (one for each of the four energy storage capacitors). Four energy storage capacitors can be internal or external to the IC package and coupled across the power supply and source terminals of each controller circuit.

In a further embodiment of an IC assembly or package for a full bridge rectifier, two of the four controller circuits share a common reference node. For example, the common reference node can correspond to the rectified DC output common node. The controller circuits that share a common reference node can also share a common power supply node and external capacitor. The controller circuits that share a common reference node may also be combined into a single controller integrated circuit. In this case, the IC assembly can have exactly seven terminals or pins. These seven terminals can include the four terminals of the bridge rectifier (i.e. two AC input terminals and two rectified DC output terminals) and the three power supply terminals (one for each of the three energy storage capacitors).

The energy storage capacitors can be external to the bridge rectifier IC assembly. In a further embodiment, the energy storage capacitors can be internal to the bridge rectifier IC assembly. In the case of internal capacitors, the bridge rectifier IC assembly can be implemented with exactly four terminals (i.e. two AC input terminals and two rectified DC output terminals).

Figure 3:
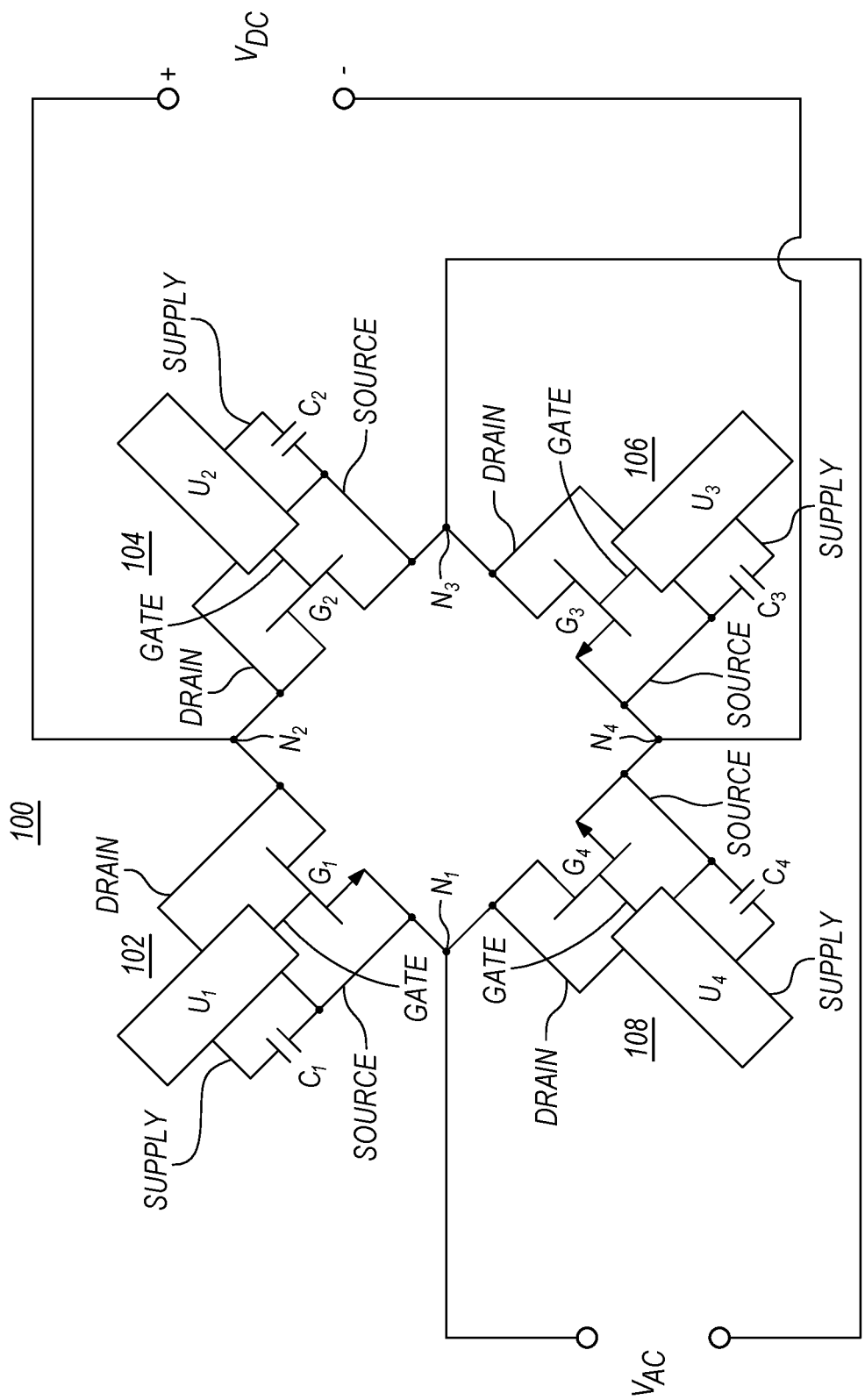
FIG. 3 illustrates a synchronous bridge rectifier in accordance with an embodiment of the present invention.

FIG. 3 illustrates a synchronous bridge rectifier 100 in accordance with an embodiment of the present invention. FIG. 3 shows a full-wave bridge rectifier arrangement with four synchronous switching units 102, 104, 106 and 108. A first switching unit 102 includes a controller $U_1$, a transistor $G_1$ and a capacitor $C_1$. A drain terminal of the transistor $G_1$ is coupled to a drain terminal of the controller $U_1$. A source terminal of the transistor $G_1$ is coupled to a source terminal of the controller $U_1$. A gate terminal of the transistor $G_1$ is coupled to a gate terminal of the controller $U_1$. A supply terminal of the controller $U_1$ is coupled to a first terminal of a capacitor $C_1$. A second terminal of the capacitor $C_1$ is coupled to the source terminal of controller $U_1$ and to source terminal of the transistor $G_1$. The switching unit 102 has drain and source terminals that correspond to those of the transistor $G_1$ and the controller $U_1$.

A second switching unit 104 includes a controller $U_2$, a transistor $G_2$ and a capacitor $C_2$. A drain terminal of the transistor $G_2$ is coupled to a drain terminal of the controller $U_2$. A source terminal of the transistor $G_2$ is coupled to a source terminal of the controller $U_2$. A gate terminal of the transistor $G_2$ is coupled to a gate terminal of the controller $U_2$. A supply terminal of the controller $U_2$ is coupled to a first terminal of a capacitor $C_2$. A second terminal of the capacitor $C_2$ is coupled to the source terminal of controller $U_2$ and to source terminal of the transistor $G_2$. The switching unit 104 has drain and source terminals that correspond to those of the transistor $G_2$ and the controller $U_2$.

A third switching unit 106 includes a controller U3, a transistor $G_3$ and a capacitor $C_3$. A drain terminal of the transistor $G_3$ is coupled to a drain terminal of the controller $U_3$. A source terminal of the transistor $G_3$ is coupled to a source terminal of the controller $U_3$. A gate terminal of the transistor $G_3$ is coupled to a gate terminal of the controller $U_3$. A supply terminal of the controller $U_3$ is coupled to a first terminal of a capacitor $C_3$. A second terminal of the capacitor $C_3$ is coupled to the source terminal of controller $U_3$ and to source terminal of the transistor $G_3$. The switching unit 106 has drain and source terminals that correspond to those of the transistor $G_3$ and the controller $U_3$.

A fourth switching unit 108 includes a controller $U_4$, a transistor $G_4$ and a capacitor $C_4$. A drain terminal of the transistor $G_4$ is coupled to a drain terminal of the controller $U_4$. A source terminal of the transistor $G_4$ is coupled to a source terminal of the controller $U_4$. A gate terminal of the transistor $G_4$ is coupled to a gate terminal of the controller $U_4$. A supply terminal of the controller $U_4$ is coupled to a first terminal of a capacitor $C_4$. A second terminal of the capacitor $C_4$ is coupled to the source terminal of controller $U_4$ and to source terminal of the transistor $G_4$. The switching unit 108 has drain and source terminals that correspond to those of the transistor $G_4$ and the controller $U_4$. The gate terminals of the transistors $G_1$, $G_2$, $G_3$ and $G_4$ may be referred to as control terminals while the drain and source terminals of the transistors $G_1$, $G_2$, $G_3$ and $G_4$ may be referred to a controlled terminals.

The source terminal of the switching unit 102 is coupled to the drain terminal of the switching unit 108 at a node $N_1$. The node $N_1$ provides a first input terminal for the AC source. The drain terminal of the switching unit 102 is coupled to the drain terminal of the switching unit 104 at a node $N_2$. The node $N_2$ provides a first output terminal for the DC output. The source terminal of the switching unit 104 is coupled to the drain terminal of the switching unit 106 at a node $N_3$. The node $N_3$ provides a second input terminal for the AC source. The source terminal of the switching unit 106 is coupled to the source terminal of the switching unit 108 at a node $N_4$. The node $N_4$ provides a second output terminal for the DC output. When an AC input signal $V_{AC}$ is applied across the input terminals of the rectifier 100 (i.e. across nodes $N_1$ and $N_3$), a rectified DC output signal $V_{DC}$ is formed across the output terminals of the rectifier 100 (i.e. across the nodes $N_2$ and $N_4$).

Figure 4:
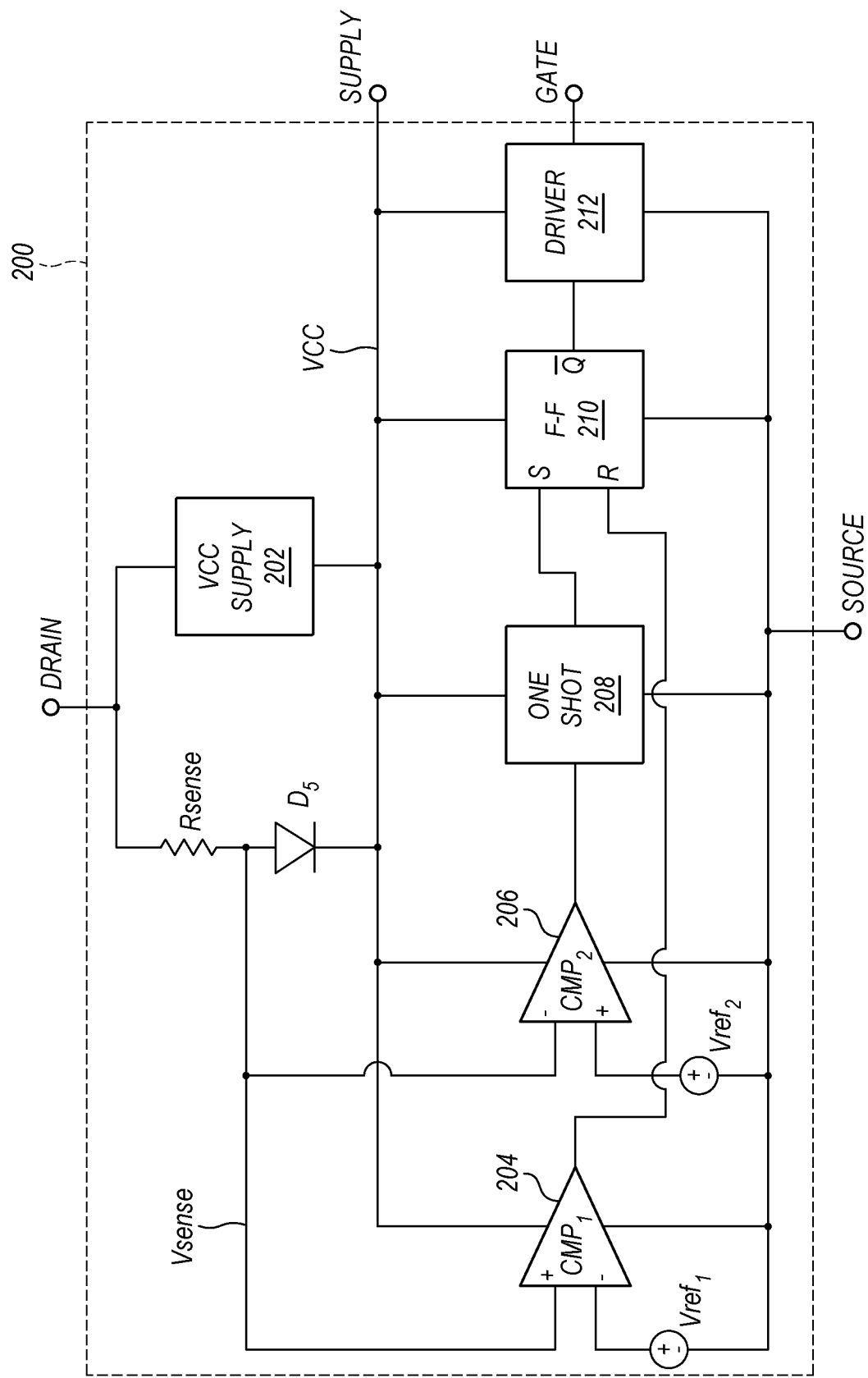
FIG. 4 illustrates a control circuit for a switching unit of a synchronous bridge rectifier in accordance with an embodiment of the present invention.

FIG. 4 illustrates a control circuit 200 for a synchronous bridge rectifier in accordance with an embodiment of the present invention. The control circuit 200 can be used in place of each of the control circuits $U_1$-$U_4$ shown in FIG. 3. As shown in FIG. 4, the control circuit 200 has a Vcc supply 202, a sensing resistor $R_{SENSE}$, a diode $D_5$, a first comparator 204, a second comparator 206, a one shot 208, a flip-flip 210, driver 212 and reference voltages Vref1 and Vref2.

The drain terminal of the control circuit 200 is coupled to a first terminal of the resistor $R_{SENSE}$ and to a first terminal of the Vcc supply 202. A second terminal of the resistor $R_{SENSE}$ is coupled to an anode of the diode $D_5$ and to a first input terminal of each of the comparators 204 and 206. A voltage sensing signal $V_{sense}$ is generated at the node between the resistor $R_{SENSE}$ and the diode $D_5$. A second terminal of the Vcc supply 202 and a cathode of the diode $D_5$ are coupled to the supply terminal of the control circuit 200. A capacitor which may be external to the control circuit 200 (this capacitor is not shown in FIG. 4, but instead shown in FIG. 3 as $C_1$, $C_2$, $C_3$ or $C_4$) is coupled across the supply and source terminals of the control circuit 200.

The controller circuit 200 is configured to receive current from the AC source $V_{AC}$ at the drain terminal of the controller circuit 200. This current passes through the resistor $R_{SENSE}$ and diode $D_5$ to charge the external capacitor ($C_1$, $C_2$, $C_3$ or $C_4$). In addition, current from the drain terminal is received at the first terminal of the Vcc supply 202 and used by the Vcc supply 202 to generate a regulated output voltage Vcc at the second terminal of the Vcc supply which regulates the voltage level on the external capacitor and which generates power for components of the controller circuit 200.

More particularly, the Vcc supply voltage is coupled to provide power to Vcc supply terminals of the first comparator 204, the second comparator 206, the one shot 208, the flip-flop 210, and the driver 212. The reference voltages Vref1 and Vref2 can be derived from a voltage level of the supply terminal. Ground terminals of the each of the first comparator 204, the second comparator 206, the one shot 208, the flip-flop 210, the driver 212 and reference voltages Vref1 and Vref2 are coupled to the source terminal of the control circuit 200. The source terminal serves as a common (ground) node for the control circuit 200.

The level of the voltage sensing signal $V_{sense}$ is representative of the drain-to-source voltage ($V_{DS}$) of the corresponding transistor ($G_1$, $G_2$, $G_3$ or $G_4$). The drain-to-source voltage of the transistor is representative of the AC source signal $V_{AC}$ as well as the level of drain-to-source current through the transistor. More particularly, the signal $V_{sense}$ represents the instantaneous level of $V_{AC}$ and, thus, represents the point in the repetitive cycle of the AC source at each instant. The signal $V_{sense}$ also represents the level of current through the transistor since the transistor has a drain-to-source resistance ($R_{DS}$). The signal $V_{sense}$ is applied to a first input terminal (e.g., noninverting input) of the comparator 204 and to a first input terminal (e.g., inverting input) of the comparator 206. A second input terminal of the comparator 204 receives the first reference voltage Vref1 while a second input terminal of the comparator 206 receives the second reference voltage Vref2. The first reference voltage Vref1 can be, for example, −5 mV, while the second reference voltage Vref2 can be, for example, −100 mv. Therefore, the first reference voltage Vref1 is higher than the second reference voltage Vref2.

Figure 5A:
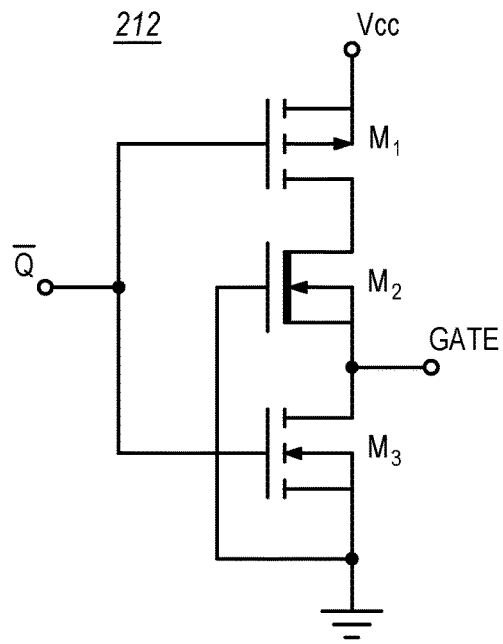
FIGS. 5A-B illustrate driver circuitry in accordance with an embodiment of the present invention.
Figure 5B:
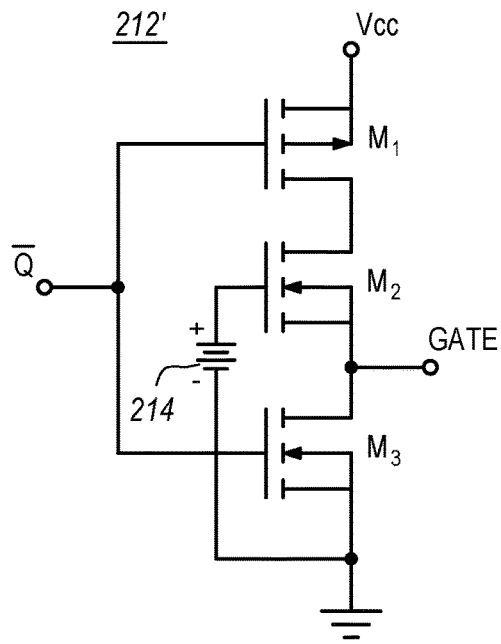

FIGS. 5A-B illustrate driver circuitry 212 in accordance with an embodiment of the present invention. Referring to FIG. 5A, the Vcc supply voltage (FIG. 4) is coupled to a source terminal of a MOSFET $M_1$. A drain terminal of the MOSFET $M_1$ is coupled to a drain terminal of MOSFET $M_2$. A source terminal of the MOSFET $M_2$ is coupled to a drain terminal of a MOSFET $M_3$ and to a GATE output terminal of the control circuit (i.e. the GATE output for the particular control circuit $U_1$, $U_2$, $U_3$ or $U_4$). A gate terminal of the MOSFET $M_2$ and a source terminal of the MOSFET $M_3$ are coupled to the ground node (i.e. the ground node for the particular control circuit $U_1$, $U_2$, $U_3$ or $U_4$). A gate terminal of the MOSFET $M_1$ and a gate terminal of the MOSFET $M_3$ are coupled to a Q-bar output of the flip-flop 210 (FIG. 4). The MOSFETs $M_1$ and $M_3$ are preferably enhancement mode MOSFETs with $M_1$ being PMOS (i.e. p-type) and $M_3$ being NMOS (i.e. n-type MOS), while the MOSFET $M_2$ is preferably depletion mode NMOS. FIG. 5B illustrates an alternative embodiment of a driver 212'. The driver 212' of FIG. 5B differs from the driver 212 of FIG. 5A in that the MOSFET $M_2$ of FIG. 5B is an enhancement mode NMOS and a voltage reference 214 is coupled between the ground node and the gate of $M_2$.

As explained herein, the level of Vcc can be approximately 12-15 volts DC with respect to the ground node. The Q-bar output of the flip-flop 210 is a logic signal which can be in the range of 0.0 volts to 12-15 volts, where 0.0 volts indicates a logic "zero" and 12-15 volts indicates a logic "one." The driver circuitry 212 of FIG. 5A and the driver circuitry 212' of FIG. 5B function to invert the polarity of the Q-bar logic input signal and to limit the voltage range of the output signal at GATE output terminal to a range of 0.0 to 5.5 volts. Driver circuitry 212 of FIG. 4 can be implemented by driver 212 of FIG. 5A, driver 212' of FIG. 5B, or by some other driver circuitry.

Figure 6:
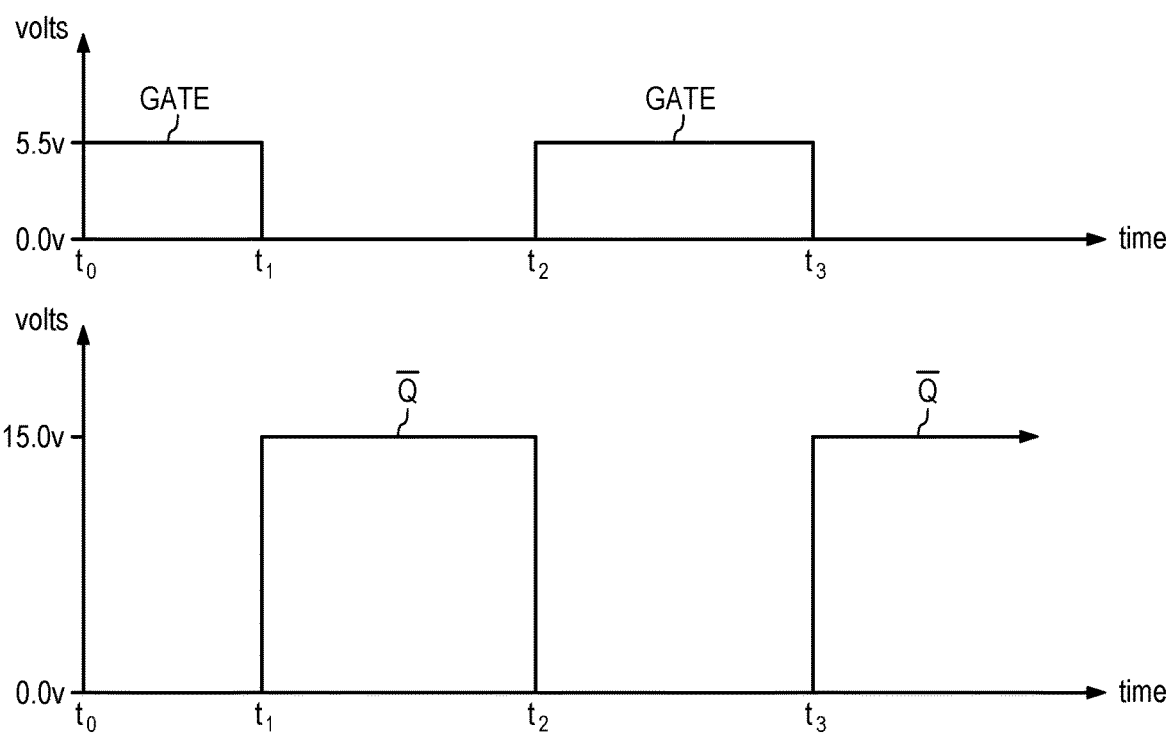
FIG. 6 illustrates a timing diagram showing operation of driver circuitry in accordance with an embodiment of the present invention.

FIG. 6 illustrates a timing diagram showing operation of the driver circuitry 212 and 212' (FIGS. 5A and 5B) in accordance with an embodiment of the present invention. The Q-bar input to the driver circuitry 212 or 212' is shown in the lower portion of FIG. 6 and has a range of 0.0 to 15.0 volts. The GATE output of the driver circuitry 212 or 212' is shown in the upper portion of FIG. 6 and has a range of 0.0 to 5.5 volts. At a time t0, the Q-bar input is at a level of 0.0 volts (logic "zero") and the GATE input is at a level of 5.5 volts (logic "one"). At a time t1, the Q-bar input transitions to a level of 15.0 volts (logic "one") and the GATE input transitions to a level of 0.0 volts (logic "zero"). At a time t2, the Q-bar input transitions to a level of 0.0 volts (logic "zero") and the GATE input transitions to a level of 5.5 volts (logic "one"). At a time t3, the Q-bar input transitions to a level of 15.0 volts (logic "one") and the GATE input transitions to a level of 0.0 volts (logic "zero"). Therefore, shown in FIG. 6, the driver circuitry 212 or 212' functions to invert the polarity of the Q-bar input signal such that the GATE output is opposite logic level to that of Q-bar. Additionally, while the voltage level of the Q-bar signal has a range of 0.0 to 15.0 volts, the voltage range of the output signal at GATE output terminal is limited to a range of 0.0 to 5.5 volts.

Synchronous rectification is performed by the bridge rectifier of FIGS. 3-4 and 5A-B as follows. When the level of $V_{AC}$ is above zero, the controller 200 in the position of $U_1$ (FIG. 3) turns on the transistor $G_1$ so that it is conducting (ON). The controller 200 in the position of $U_3$ also turns on the transistor $G_3$ so that it is conducting (ON). Meanwhile, the controllers 200 in the position of $U_2$ and $U_4$ turn off the transistor $G_2$ and $G_4$ so that they are non-conducting (OFF). This causes the voltage $V_{Ac}$ to be passed to the output $V_{Dc}$ without reversing its polarity.

Conversely, when the level of $V_{Ac}$ is below zero, the controller 200 in the position of $U_1$ (FIG. 3) turns off the transistor $G_1$ so that it is non-conducting (OFF). The controller 200 in the position of $U_3$ also turns off the transistor $G_3$ so that it is non-conducting (OFF). Meanwhile, the controllers 200 in the position of $U_2$ and $U_4$ turn on the transistor $G_2$ and $G_4$ so that they are conducting (ON). This causes the voltage $V_{Ac}$ to be passed to the output $V_{Dc}$ with its polarity reversed. This cycle is repeated for each cycle of the input signal $V_{Ac}$ thereby forming the rectified signal $V_{Dc}$.

The above is accomplished in accordance with the following synchronous switching cycle. While the level of $V_{Ac}$ is above zero, the transistors $G_1$ and $G_3$ are on (with current flowing from source to drain) and the transistors $G_2$ and $G_4$ are off. Under these conditions, the drain-to-source voltage across the transistors $G_1$ and $G_3$ is negative and the level of $V_{sense}$ for the controllers $U_1$ and $U_3$ is also negative. Also, the drain-to-source voltage across the transistors $G_2$ and $G_4$ is positive and the level of $V_{sense}$ for the controllers $U_2$ and $U_4$ is also positive.

Then, as the level of $V_{Ac}$ falls such that it approaches the zero volt level, the drain-to-source voltages across the transistors $G_1$ and $G_3$ begin transitioning from negative to positive ($V_{DS}$ is rising). This causes the level of $V_{sense}$ for the controllers $U_1$ and $U_3$ to rise. Once the levels of $V_{sense}$ for each of the controllers $U_1$ and $U_3$ rises above Vref1, this triggers the comparators 204 of $U_1$ and $U_3$, which then resets the flip-flops 210 and turns off the transistors $G_1$ and $G_3$ via drivers 212 or 212'.

Meanwhile, as the level of $V_{Ac}$ falls such that it approaches the zero volt level, the drain-to-source voltages across the transistors $G_2$ and $G_4$ begin transitioning from positive to negative ($V_{DS}$ is falling). This causes the levels of $V_{sense}$ for each of the controllers $U_2$ and $U_4$ to fall. Once the level of $V_{sense}$ falls below Vref2, the comparators 206 of $U_2$ and $U_4$ then trigger the one-shots 208 to set the flip-flops 210 which turns on the transistors $G_2$ and $G_4$ via drivers 212 or 212'.

Each of the one-shots 208 functions to generate a pulse sufficient to set the flip-flops 210, though the output of the one-shot 208 will then transition to a logic low voltage even if the output of the comparator 206 remains a logic high voltage. This prevents the transistors from turning on more than once per cycle of the AC source $V_{Ac}$.

While the level of $V_{Ac}$ remains below zero, the transistors $G_2$ and $G_4$ are on (with current flowing from source to drain) and the transistors $G_1$ and $G_3$ are off. Under these conditions, the drain-to-source voltage across the transistors $G_2$ and $G_4$ is negative and the level of $V_{sense}$ for the controllers $U_2$ and $U_4$ is also negative. Also, the drain-to-source voltage across the transistors $G_1$ and $G_3$ is positive and the level of $V_{sense}$ for the controllers $U_1$ and $U_3$ is also positive.

Then, as the level of $V_{Ac}$ rises such that it approaches the zero volt level, the drain-to-source voltages across the transistors $G_2$ and $G_4$ begin transitioning from negative to positive ($V_{DS}$ is rising). This causes the level of $V_{sense}$ for the controllers $U_2$ and $U_4$ to rise. Once the levels of $V_{sense}$ for each of the controllers $U_2$ and $U_4$ rises above Vref1, this triggers the comparators 204 of $U_2$ and $U_4$, which then resets the flip-flops 210 and turns off the transistors $G_2$ and $G_4$ via drivers 212 or 212'.

Meanwhile, as the level of $V_{Ac}$ rises such that it approaches the zero volt level, the drain-to-source voltages across the transistors $G_1$ and $G_3$ begin transitioning from positive to negative ($V_{DS}$ is falling). This causes the levels of $V_{sense}$ for each of the controllers $U_1$ and $U_3$ to fall. Once the level of $V_{sense}$ falls below Vref2, the comparators 206 of $U_1$ and $U_3$ then trigger the one-shots 208 to set the flip-flops 210 which turns on the transistors $G_1$ and $G_3$ via drivers 212 or 212'.

The above-described synchronous switching cycle repeats for each cycle of the input voltage $V_{AC}$.

Because the comparators 204 and 206 are activated at different levels of $V_{sense}$ to turn the transistors $G_1$, $G_2$, $G_3$ and $G_4$ on and off, this prevents any adjacent transistors (e.g., $G_1$ and $G_2$) from being on at the same time which could cause shoot through or short circuiting of the input $V_{Ac}$ or the output $V_{DC}$. This is despite the controllers $U_1$, $U_2$, $U_3$ and $U_4$ all operating independently.

As explained herein, each controller circuit 200 is preferably equipped with a power supply 202 for powering itself from the AC source. A capacitor coupled to each controller circuit (capacitors $C_1$, $C_2$, $C_3$, and $C_4$) serves as an energy reservoir for the controller circuit 200. When the drain-to-source voltage of the corresponding one of the transistors $G_1$, $G_2$, $G_3$ and $G_4$, is positive, the transistor is turned off and the power supply 202 charges the corresponding one of the capacitors ($C_1$, $C_2$, $C_3$, and $C_4$). Current through the sensing resistor $R_{SENSE}$ can also charge the corresponding one of the capacitors ($C_1$, $C_2$, $C_3$, and $C_4$). The current for charging the capacitors $C_1$, $C_2$, $C_3$, and $C_4$ is obtained from the input AC source $V_{AC}$. When the drain-to-source voltage of the corresponding one of the transistors $G_1$, $G_2$, $G_3$ and $G_4$, is negative, the transistor is turned on. Under this condition, the AC source is unavailable to charge the corresponding one of the capacitors ($C_1$, $C_2$, $C_3$, and $C_4$). This is because $V_{AC}$ is of the opposite polarity than the voltage on the capacitor. Also under this condition, the charge on the capacitor is used to power the controller 200 until $V_{AC}$ changes polarity and again becomes available to charge the capacitor. Thus, the capacitor coupled to each controller circuit 200 serves as an energy reservoir to provide power to the controller circuit 200 at times when the power supply of the controller circuit is unable to derive power from the AC input signal. Because the controller 200 uses only a small amount of energy and the duration of time that the capacitor needs to serve as a reservoir is short (e.g., 8-10 milliseconds for a 50 Hz AC source), the capacitor can be small (e.g. on the order of 10-20 nF). The level of Vcc is preferably maintained between approximately 15 and 20 volts DC which can vary dependent upon the reservoir capacitor size and discharge rate during each cycle of $V_{Ac}$.

Figure 7:
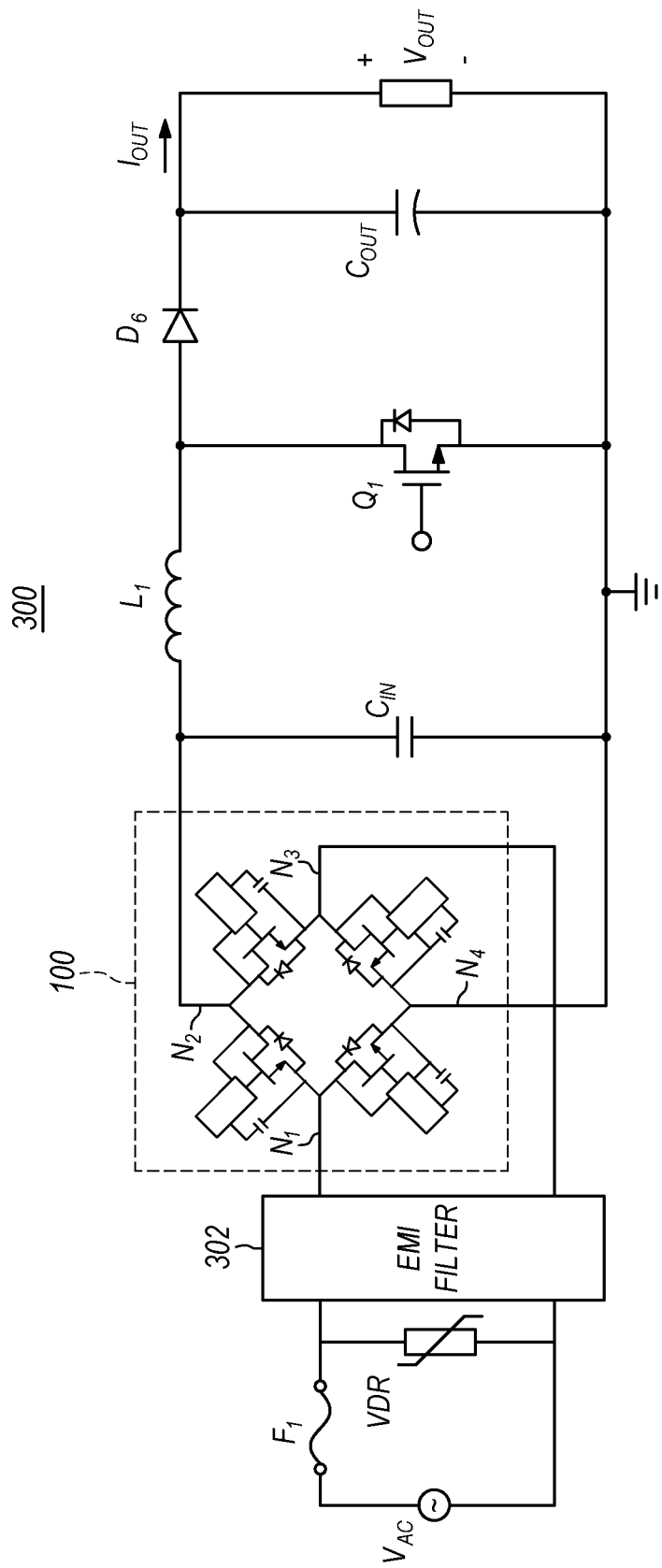
FIG. 7 illustrates a switching power converter in accordance with an embodiment of the present invention.

FIG. 7 illustrates a switching power converter 300 in accordance with an embodiment of the present invention. As shown in FIG. 7, the switching power converter 300 is configured to receive power from an AC source $V_{AC}$. A first input terminal of converter 300 is coupled to a first terminal of a fuse $F_1$. A second terminal of the fuse $F_1$ is coupled to a first input terminal of an electromagnetic interference (EMI) filter 302. A second input terminal of converter 300 is coupled to a second input terminal of the EMI filter 302. A first output terminal of the EMI filter 302 is coupled to a first AC input terminal of the synchronous rectifier 100. A second output terminal of the EMI filter 302 is coupled to a second AC input terminal of the synchronous rectifier 100.

A first DC output terminal of the synchronous rectifier 100 is coupled to a first terminal of an inductor $L_1$. And to a first terminal of a capacitor $C_{IN}$. A second terminal of the inductor $L_1$ is coupled to an anode of a diode $D_6$ and to a drain terminal of a transistor $Q_1$. A cathode of the diode $D_6$ is coupled to a first terminal of a capacitor $C_{OUT}$ and to an output terminal of the converter 300. A second DC output terminal of the synchronous rectifier 100, a second terminal of the capacitor $C_{IN}$, a second terminal of the capacitor $C_{OUT}$, and a source terminal of the transistor $Q_1$ are coupled to a ground node. The converter 300 is configured to provide a regulated DC output voltage $V_{OUT}$ to a load by turning the transistor $Q_1$ on and off using frequency modulation (FM) or pulse-width modulation (PWM).

While a boost converter is shown in FIG. 7, the present invention can used for any type of power converter or power supply that requires a bridge rectifier, such as buck converter, a buck-boost converter, resonant converter, a power-factor correction stage of a switching power supply and so forth. Also, while a full-bridge rectifier is shown in FIGS. 3 and 7, it will be apparent that the switching units of the present invention can be used in other types of rectifiers, such as a half-bridge rectifier. The switching units of the present invention may also be used to replace diodes or other types of rectifiers in other contexts.

As explained herein, the level of $V_{sense}$ in each of the controllers $U_1$, $U_2$, $U_3$ and $U_4$ is representative of the instantaneous level of $V_{AC}$ and is also representative of the level of current through the corresponding transistor $G_1$, $G_2$, $G_3$ and $G_4$. This is because the transistors each have a drain-to-source resistance ($R_{DS}$) which affects the drain-to-source voltage level ($V_{DS}$). When used in a power supply, such as the one shown in FIG. 7, the power requirements of the load can change over time. In response to such changing load requirements, the levels of the currents through the transistor $G_1$, $G_2$, $G_3$ and $G_4$ can also change. In some conditions, where the load is light or temporarily ceases drawing power, the level of current in the transistors $G_1$, $G_2$, $G_3$ and $G_4$ may be sufficiently low that the level of $V_{sense}$ does not trigger the comparators 206 to turn on the transistors $G_1$, $G_2$, $G_3$ and $G_4$. In this case, the bridge rectifier 100 maintains the transistors $G_1$, $G_2$, $G_3$ and $G_4$ in an off condition, thereby conserving energy, until such time as the current demand rises sufficiently that the transistors again resume synchronous rectification.

Figure 8:
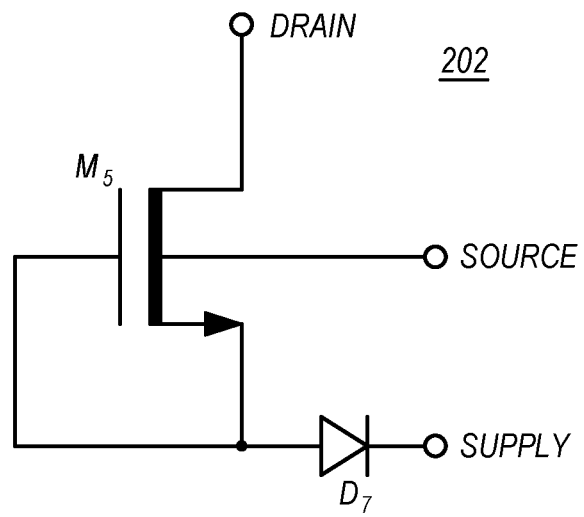
FIG. 8 illustrates a power supply for a switching unit in accordance with an embodiment of the present invention.

FIG. 8 illustrates a power supply for a switching unit in accordance with an embodiment of the present invention. More particularly, FIG. 8 illustrates a power supply 202 for the controller 200 of the switching units 102, 104, 106 and 108 in accordance with an embodiment of the present invention. As shown in FIG. 8, a depletion mode MOSFET $M_5$, e.g., an 800 volt, ultra-high voltage (UHV) NMOSFET, has its drain terminal coupled to the drain terminal of the controller 200. The source and gate terminals of $M_5$ are coupled to each other and to an anode of a diode $D_7$. A cathode of the diode $D_7$ is coupled to the supply terminal of the controller 200. A body terminal of $M_5$ is coupled to the source terminal of the controller. When the drain-to-source voltage of the corresponding one of the transistors $G_1$, $G_2$, $G_3$ and $G_4$ is positive, the power supply 202 of the corresponding controller 200 is active; under these conditions, the power supply 202 supplies power to components of the controller 200 and charges the corresponding one of the external capacitors $C_1$, $C_2$, $C_3$ and $C_4$. When the drain-to-source voltage of the corresponding one of the transistors $G_1$, $G_2$, $G_3$ and $G_4$ is negative, the power supply 202 is inactive and the controller 200 instead draws power from the corresponding one of the external capacitors $C_1$, $C_2$, $C_3$ and $C_4$. The resistor $R_{SENSE}$ can also be implemented as a depletion mode MOSFET. The resistor $R_{SENSE}$ and the power supply 202 can be combined and implemented as a single component.

Figure 9:
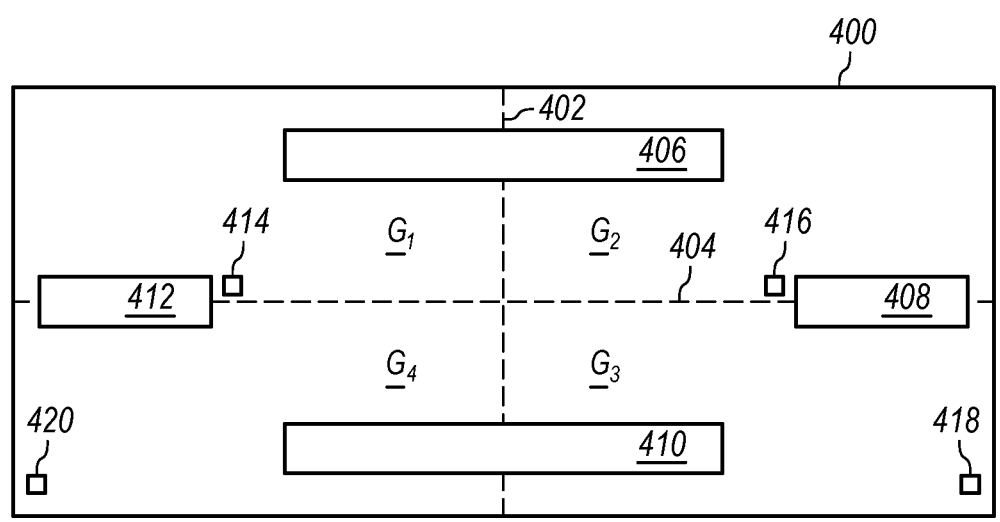
FIG. 9 illustrates a four-transistor, monolithic integrated circuit die in accordance with an embodiment of the present invention.

FIG. 9 illustrates a four-transistor, monolithic integrated circuit die 400 in accordance with an embodiment of the present invention. As shown in FIG. 9, the die includes four transistors $G_1$, $G_2$, $G_3$, and $G_4$. The transistors may comprise high-electron-mobility transistors (HEMTs), such as gallium nitride (GaN) transistors deposited on a single substrate. Such switched elements are preferably "planar" in that they tend to occupy greater area per device than equivalent capacity "vertical" structures such as metal-oxide-silicon field-effect transistors (MOSFETs). The overall size of the die can be, for example, approximately 7593 microns (um) by 2311 microns (um). The die 400 is divided into four quadrants, one for each of the transistors $G_1$, $G_2$, $G_3$, and $G_4$ by isolation barriers 402, 404 shown by dotted lines. The isolation barriers 402, 404 can include, for example, trenches and/or one or more buffer materials.

Also shown in FIG. 9 are metallic terminals or pads 406, 408, 410, 412, 414, 416, 418 and 420. The pads 406-420 are electrically coupled to the drain, source and gate terminals of the transistors $G_1$, $G_2$, $G_3$, and $G_4$, as explained below. More particularly, the pad 406 is connected to the drain terminals of both transistors $G_1$ and $G_2$. As shown in FIG. 3, the drain terminal of the transistor $G_1$ is coupled to the drain terminal of the transistor $G_2$. Accordingly, the pad 406 connects these two drain terminals together and corresponds to the node $N_2$ of FIG. 3. Similarly, the pad 408 is connected to the source terminal of the transistor $G_2$ and to the drain terminal of the transistor $G_3$. As shown in FIG. 3, the source terminal of the transistor $G_2$ is coupled to the drain terminal of the transistor $G_3$. The pad 408 therefore corresponds to the node $N_3$ of FIG. 3. The pad 410 is connected to the source terminal of the transistor $G_3$ and to the source terminal of the transistor $G_4$. As shown in FIG. 3, the source terminal of the transistor $G_3$ is coupled to the source terminal of the transistor $G_4$. The pad 410 therefore corresponds to the node $N_4$ of FIG. 3. The pad 412 is connected to the drain terminal of the transistor $G_4$ and to the source terminal of the transistor $G_1$. As shown in FIG. 3, the drain terminal of the transistor $G_4$ is coupled to the source terminal of the transistor $G_1$. The pad 412 therefore corresponds to the node $N_1$ of FIG. 3.

Pad 414 is connected to the gate terminal of the transistor $G_1$. Pad 416 is connected to the gate terminal of the transistor $G_2$. Pad 418 is connected to the gate terminal of the transistor $G_3$. Pad 420 is connected to the gate terminal of the transistor $G_4$.

Because the pads 414, 416, 418 and 420 are connected to transistor gate terminals, they carry relative low current and can be relatively small. In contrast, the pads 406, 408, 410 and 412 carry large through currents needed to accomplish rectification of the AC input signal. The pads 406, 408, 410 and 412 are therefore larger than the pads 414, 416, 418 and 420. In an embodiment, there are exactly eight metallic terminals or pads 406, 408, 410, 412, 414, 416, 418 and 420.

Figure 10:
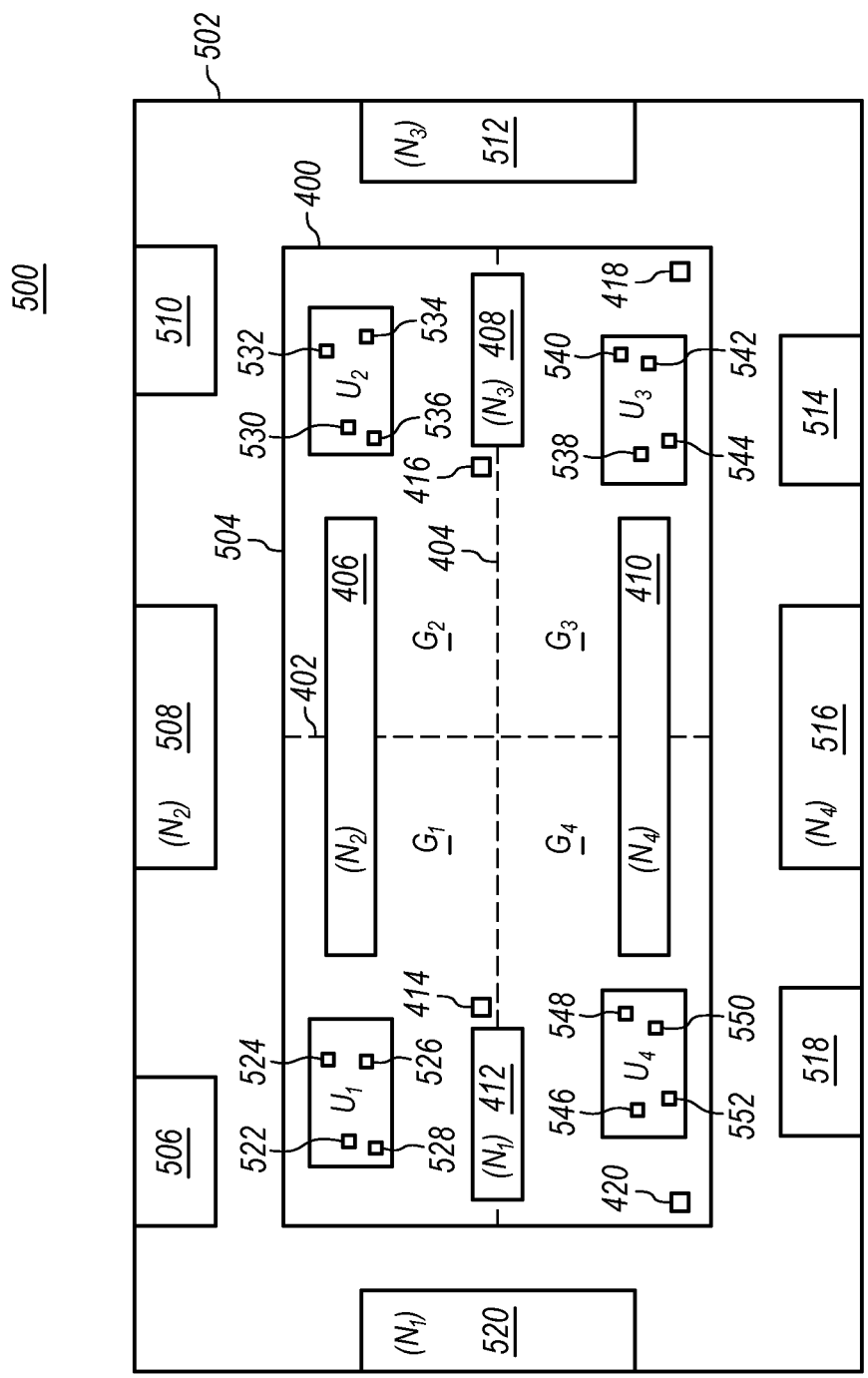
FIG. 10 illustrates an integrated circuit assembly for a synchronous bridge rectifier in accordance with an embodiment of the present invention.

FIG. 10 illustrates an integrated circuit assembly 500 for a synchronous bridge rectifier in accordance with an embodiment of the present invention. The assembly 500 includes a lead frame 502 which can include a die pad 504, upon which the die 400 is physically mounted (i.e. mechanically attached), such as by epoxy, and metallic terminals or leads 506, 508, 510, 512, 514, 516, 518 and 520. The metallic leads 506, 508, 510, 512, 514, 516, 518 and 520 can be used to connect circuitry and components internal to the assembly 500 to circuitry and components external to the assembly. More particularly, the lead 506 can be coupled to the supply node for the controller $U_1$. The lead 508 can be connected to node $N_2$ (FIGS. 3 and 7). The lead 510 can be coupled to the supply node for the controller $U_2$. The lead 512 can be coupled to node $N_3$ (FIGS. 3 and 7). The lead 514 can be coupled to the supply node for the controller $U_3$. The lead 516 can be coupled to node $N_4$ (FIGS. 3 and 7). The lead 518 can be coupled to the supply node for the controller $U_4$. The lead 520 can be coupled to node N1 (FIGS. 3 and 7).

Also shown in FIG. 10 are integrated circuit controllers $U_1$, $U_2$, $U_3$, and $U_4$ which are physically mounted (i.e. mechanically attached), such as by epoxy, on the die 400. The controllers $U_1$, $U_2$, $U_3$, and $U_4$ correspond to the controllers $U_1$, $U_2$, $U_3$, and $U_4$ illustrated in FIG. 3. As is also shown in FIG. 10, each of the controller ICs includes four metallic terminals or pads which provide connections between the controller ICs and circuitry and components external to the ICs. The four pads of each of the controller ICs provide the gate, drain, source and supply terminals shown in FIG. 3. More particularly, the controller IC $U_1$ includes pad 522 (source), 524 (supply), 526 (drain), and 528 (gate). The controller IC $U_2$ includes pad 530 (source), 532 (supply), 534 (drain), and 536 (gate). The controller IC $U_3$ includes pad 538 (source), 540 (supply), 542 (drain), and 544 (gate). The controller IC $U_4$ includes pad 546 (source), 548 (supply), 550 (drain), and 552 (gate).

Figure 11:
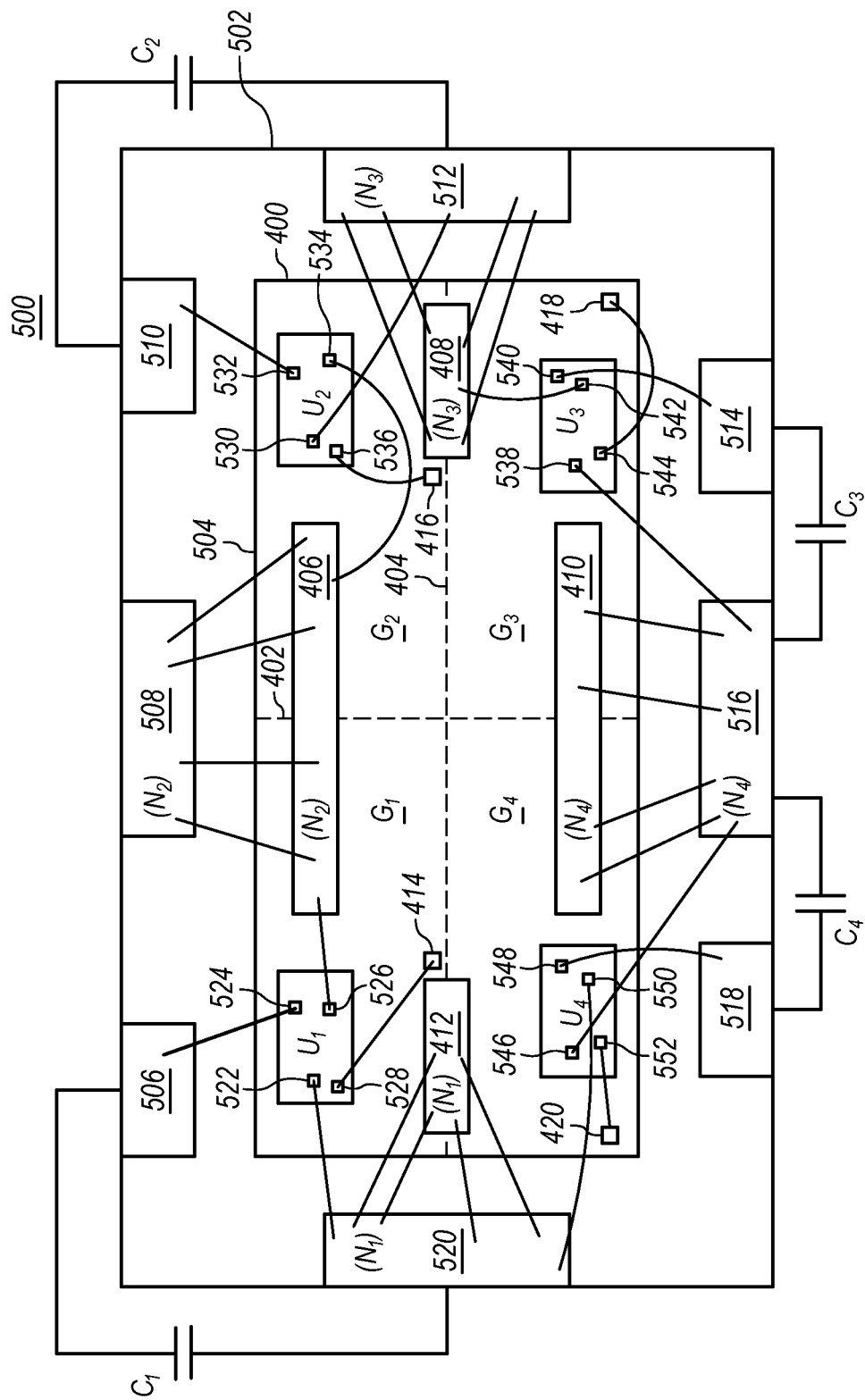
FIG. 11 illustrates exemplary bond wire connections of an integrated circuit assembly for a synchronous bridge rectifier in accordance with an embodiment of the present invention.

Bond wires can be used within the assembly 500 to connect the transistors $G_1$, $G_2$, $G_3$, and $G_4$, the controller ICs $U_1$, $U_2$, $U_3$, and $U_4$ and to the lead frame 502 as appropriate. This is shown in FIG. 11. More particularly, FIG. 11 illustrates exemplary bond wire connections of an integrated circuit assembly for a synchronous bridge rectifier in accordance with an embodiment of the present invention.

FIG. 11 also shows the capacitors $C_1$, $C_2$, $C_3$, and $C_4$. More particularly, a first terminal of the capacitor $C_1$ is coupled to the lead 506 (i.e. supply node for $U_1$). A second terminal of the capacitor $C_1$ is coupled to the lead 520 (i.e. node $N_1$). A first terminal of the capacitor $C_2$ is coupled to the lead 510 (i.e. supply node for $U_2$). A second terminal of the capacitor $C_2$ is coupled to the lead 512 (i.e. node $N_3$). A first terminal of the capacitor $C_3$ is coupled to the lead 514 (i.e. supply node for $U_3$). A second terminal of the capacitor $C_3$ is coupled to the lead 516 (i.e. node $N_4$). A first terminal of the capacitor $C_4$ is coupled to the lead 518 (i.e. supply node for $U_4$). A second terminal of the capacitor $C_4$ is coupled to the lead 516 (i.e. node $N_4$). The capacitors $C_1$, $C_2$, $C_3$, and $C_4$ can be internal to the assembly 500. For example, the capacitors $C_1$, $C_2$, $C_3$, and $C_4$ can be physically mounted (i.e. mechanically attached), such as by epoxy, to the respective controller ICs $U_1$, $U_2$, $U_3$ and $U_4$, or directly to the die 400. Alternatively, the capacitors $C_1$, $C_2$, $C_3$, and $C_4$ can be external to the assembly 500, as shown in FIG. 11.

Figure 12:
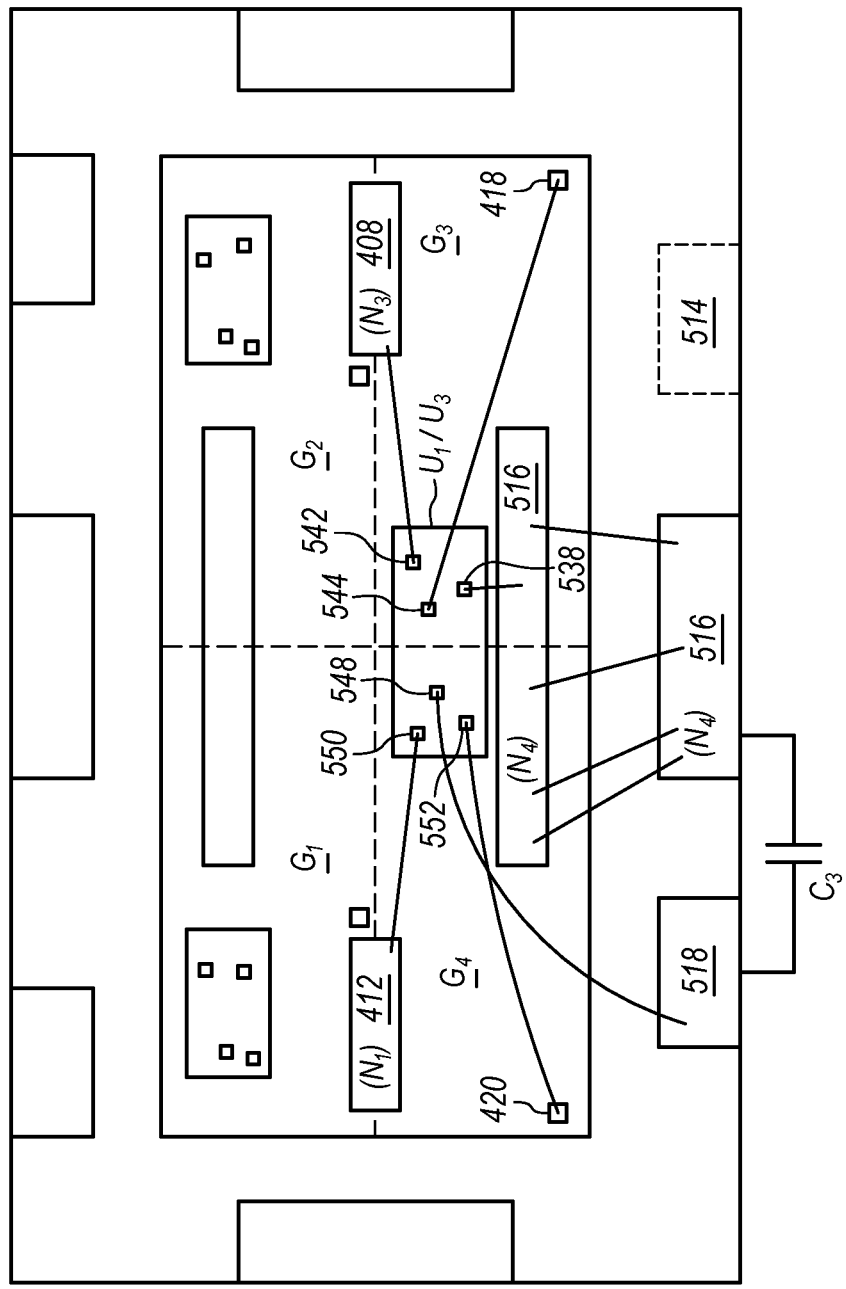
FIG. 12 illustrates an integrated circuit assembly for a synchronous bridge rectifier in accordance with an alternative embodiment of the present invention.

FIG. 12 illustrates an integrated circuit assembly for a synchronous bridge rectifier in accordance with an alternative embodiment of the present invention. The integrated circuit assembly of FIG. 12 differs from that of FIG. 11 primarily in that the controllers $U_1$ and $U_3$ are combined into a single controller IC referenced as $U_1/U_3$. For clarity of illustration, not all aspects of the integrated circuit assembly of FIG. 11 are shown in or discussed in connection in FIG. 12. For example, the capacitors $C_1$ and $C_2$ and numerous bond wires are not shown. It will be understood that aspects of the integrated circuit assembly of FIG. 12 that are not discussed or illustrated, including the capacitors $C_1$ and $C_2$ and numerous bond wires, can be identical to that of FIG. 11.

The combined controller $U_1/U_3$ can include two instances of the controller 200 shown in FIG. 4, but with the two SOURCE terminals coupled together. The two SUPPLY terminals may also be coupled together and coupled the capacitor $C_3$.

Therefore, as shown in FIG. 12, the combined controller IC has six terminals or pads 538 (source), 542 (drain), and 544 (gate), 548 (supply), 550 (drain), and 552 (gate), which correspond to like referenced elements of FIG. 11. The source terminal 546 (FIG. 11) can be omitted because the combined integrated circuit $U_1/U_2$ can utilize the source pad 538 which serves the same purpose as the pad 546. This is because the two source terminals of the transistors $G_3$ and $G_4$ of FIG. 12 are coupled together at the node $N_4$ (which is also shown in FIG. 3).

The supply terminal or pad 540 of FIG. 11 can also be omitted because the combined integrated circuit $U_1/U_2$ can utilize the supply pad 548 which serves the same purpose as the pad 540 (FIG. 11). For example, the combined integrated circuit $U_1/U_2$ can have single supply terminal SUPPLY (FIG. 4). In the case where a single supply terminal is provided, the capacitor $C_4$ and pad 514 can also be omitted. In this case, the two instances of the controller 200 (FIG. 4) of the combined integrated circuit $U_1/U_2$ can utilize a single capacitor $C_3$. Because the pad 514 can be omitted, the integrated circuit assembly of FIG. 10 can have seven terminals rather than eight as in FIG. 11.

Figure 13C:
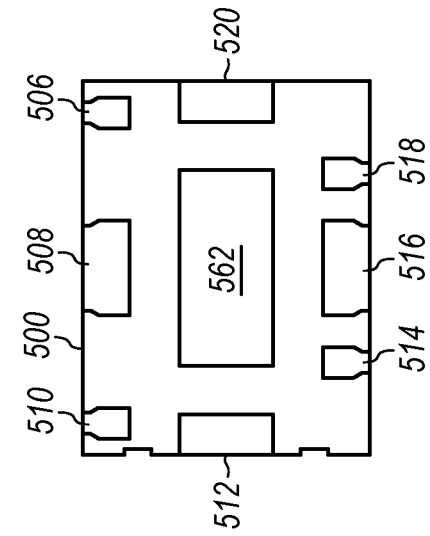
FIGS. 13A-D illustrate top, side, bottom and end elevation views of an integrated circuit assembly for a synchronous bridge rectifier in accordance with an embodiment of the present invention.
Figure 13B:
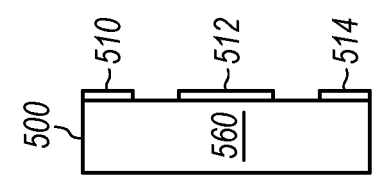
Figure 13A:
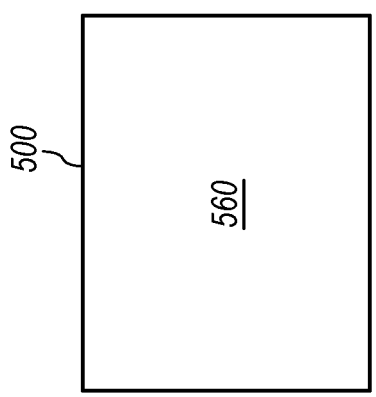
Figure 13D:
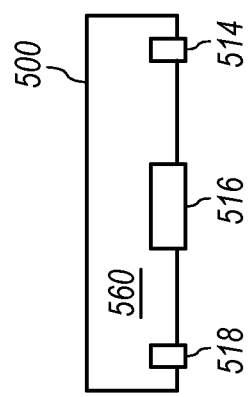

FIGS. 13A-D illustrate top, side, bottom and end elevation views of an integrated circuit assembly 500 for a synchronous bridge rectifier in accordance with an embodiment of the present invention. More particularly, FIG. 13A illustrates a top view of the integrated circuit assembly 500, FIG. 13B illustrates a left side elevation view of the integrated circuit assembly 500 (the right side elevation view, which is not shown, being a mirror image of the left side view), FIG. 13C illustrates a bottom view of the integrated circuit assembly 500, and FIG. 13D illustrates a front elevation view of the integrated circuit assembly 500 (the rear elevation view, which is not shown, being a mirror image of the front view). Epoxy 560 is visible in the top, sides, and front and rear views of the integrated circuit assembly 500. The side view of FIG. 13B additionally shows the leads 510, 512 and 514. The bottom view of FIG. 13C shows the leads 506, 508, 510, 512, 514, 516, 518 and 520, as well as heat sink 562 which may be physically mounted (i.e. mechanically attached) to the lead frame 502 (FIG. 10) on a side opposite the die 400 (FIG. 10). The front view of FIG. 13D shows the epoxy 560 and the leads 514, 516 and 518.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A bridge rectifier comprising:
 a monolithic die, the monolithic die comprising:
  a first planar transistor occupying a first quadrant of the monolithic die; the first planar transistor having a gate, a drain and a source;
  a second planar transistor occupying a second quadrant of the monolithic die; the second planar transistor having a gate, a drain and a source;
  a third planar transistor occupying a third quadrant of the monolithic die; the third planar transistor having a gate, a drain and a source; and
  a fourth planar transistor occupying a fourth quadrant of the monolithic die; the fourth planar transistor having a gate, a drain and a source;
 a first metallic pad mechanically attached to the monolithic die and occupying portions of the first and second quadrants, the first metallic pad configured to electrically couple the drain of the first planar transistor to the drain of the second planar transistor;
 a second metallic pad mechanically attached to the monolithic die and occupying portions of the second and third quadrants, the second metallic pad configured to electrically couple the source of the second planar transistor to the drain of the third planar transistor;
 a third metallic pad mechanically attached to the monolithic die and occupying portions of the third and fourth quadrants, the third metallic pad configured to electrically couple the source of the third planar transistor to the source of the fourth planar transistor;
 a fourth metallic pad mechanically attached to the monolithic die and occupying portions of the third and fourth quadrants, the fourth metallic pad configured to electrically couple the drain of the fourth planar transistor to the source of the first planar transistor;
 a fifth metallic pad mechanically attached to the monolithic die and occupying a portion of the first quadrant, the fifth metallic pad coupled to the gate of the first planar transistor;
 a sixth metallic pad mechanically attached to the monolithic die and occupying a portion of the second quadrant, the sixth metallic pad coupled to the gate of the second planar transistor;
 a seventh metallic pad mechanically attached to the monolithic die and occupying a portion of the third quadrant, the seventh metallic pad coupled to the gate of the third planar transistor;
 an eighth metallic pad mechanically attached to the monolithic die and occupying a portions of the fourth quadrant, the eighth metallic pad coupled to the gate of the fourth planar transistor;
 a plurality of controller integrated circuits mechanically attached to the monolithic die, the plurality of controller integrated circuits configured to generate drive signals for controlling the gate terminals of the first, second, third and fourth planar transistors, wherein the plurality of controller integrated circuits comprises exactly three controller integrated circuits, including a first controller integrated circuit for controlling the gate of the first planar transistor, a second controller integrated circuit for controlling the gate of the second planar transistor, and a third controller integrated circuit for controlling the gate of the third planar transistor and the gate of the fourth planar transistor, wherein the integrated circuit assembly comprises exactly seven terminals, including two bridge rectifier input terminals, two bridge rectifier output terminals, and three supply terminals, one for each of the three integrated circuit controllers; and
 three capacitors wherein each of the three supply terminals is coupled to corresponding one of the three capacitors and wherein the capacitors are internal to the integrated circuit assembly.

2. The monolithic die according to claim 1, wherein the first, second, third and fourth planar transistors comprise high-electron-mobility transistors (HEMTs).

3. The monolithic die according to claim 1, wherein the first, second, third and fourth planar transistors comprise gallium nitride (GaN) transistors.

4. The monolithic die according to claim 1, wherein the first, second, third and fourth planar transistors comprise materials selected from the group consisting of silicon carbide, bipolar and germanium semiconductor materials.

5. A bridge rectifier comprising:
a monolithic die, the monolithic die comprising:
a first planar transistor occupying a first quadrant of the monolithic die; the first planar transistor having a gate, a drain and a source;
a second planar transistor occupying a second quadrant of the monolithic die; the second planar transistor having a gate, a drain and a source;
a third planar transistor occupying a third quadrant of the monolithic die; the third planar transistor having a gate, a drain and a source;
a fourth planar transistor occupying a fourth quadrant of the monolithic die; the fourth planar transistor having a gate, a drain and a source;
a first metallic pad mechanically attached to the monolithic die and occupying portions of the first and second quadrants, the first metallic pad configured to electrically couple the drain of the first planar transistor to the drain of the second planar transistor;
a second metallic pad mechanically attached to the monolithic die and occupying portions of the second and third quadrants, the second metallic pad configured to electrically couple the source of the second planar transistor to the drain of the third planar transistor;
a third metallic pad mechanically attached to the monolithic die and occupying portions of the third and fourth quadrants, the third metallic pad configured to electrically couple the source of the third planar transistor to the source of the fourth planar transistor;
a fourth metallic pad mechanically attached to the monolithic die and occupying portions of the third and fourth quadrants, the fourth metallic pad configured to electrically couple the drain of the fourth planar transistor to the source of the first planar transistor;
a fifth metallic pad mechanically attached to the monolithic die and occupying a portion of the first quadrant, the fifth metallic pad coupled to the gate of the first planar transistor;
a sixth metallic pad mechanically attached to the monolithic die and occupying a portion of the second quadrant, the sixth metallic pad coupled to the gate of the second planar transistor;
a seventh metallic pad mechanically attached to the monolithic die and occupying a portion of the third quadrant, the seventh metallic pad coupled to the gate of the third planar transistor;
an eighth metallic pad mechanically attached to the monolithic die and occupying a portions of the fourth quadrant, the eighth metallic pad coupled to the gate of the fourth planar transistor;
a plurality of controller integrated circuits mechanically attached to the monolithic die, the plurality of controller integrated circuits configured to generate drive signals for controlling the gate terminals of the first, second, third and fourth planar transistors, wherein the plurality of controller integrated circuits comprises exactly three controller integrated circuits, including a first controller integrated circuit for controlling the gate of the first planar transistor, a second controller integrated circuit for controlling the gate of the second planar transistor, and a third controller integrated circuit for controlling the gate of the third planar transistor and the gate of the fourth planar transistor, wherein the integrated circuit assembly comprises exactly seven terminals, including two bridge rectifier input terminals, two bridge rectifier output terminals, and three supply terminals, one for each of the three integrated circuit controllers; and
three capacitors wherein each of the three supply terminals is coupled to corresponding one of the three capacitors and wherein the capacitors are external to the integrated circuit assembly.

6. The monolithic die according to claim 5, wherein the first, second, third and fourth planar transistors comprise high-electron-mobility transistors HEMTs).

7. The monolithic die according to claim 5, wherein the first, second, third and fourth planar transistors comprise gallium nitride (GaN) transistors.

8. The monolithic die according to claim 5, wherein the first, second, third and fourth planar transistors comprise materials selected from the group consisting of silicon carbide, bipolar and germanium semiconductor materials.

9. An integrated circuit assembly comprising:
a monolithic die comprising:
a first planar transistor occupying a first quadrant of the monolithic die, the first planar transistor having a gate, a drain and a source;
a second planar transistor occupying a second quadrant of the monolithic die; the second planar transistor having a gate, a drain and a source;
a third planar transistor occupying a third quadrant of the monolithic die, the third planar transistor having a gate, a drain and a source; and
a fourth planar transistor occupying a fourth quadrant of the monolithic die, the fourth planar transistor having a gate, a drain and a source;
a plurality of controller integrated circuits mechanically attached to the monolithic die, the plurality of controller integrated circuits configured to generate drive signals for controlling the gate terminals of the first, second, third and fourth planar transistors, wherein the plurality of controller integrated circuits comprises exactly three controller integrated circuits, including a first controller integrated circuit for controlling the gate of the first planar transistor, a second controller integrated circuit for controlling the gate of the second planar transistor, and a third controller integrated circuit for controlling the gate of the third planar transistor and the gate of the fourth planar transistor, wherein the integrated circuit assembly functions as a bridge rectifier and comprises exactly seven terminals, including two bridge rectifier input terminals, two bridge rectifier output terminals, and three supply terminals, one for each of the three integrated circuit controllers; and
three capacitors wherein each of the three supply terminals is coupled to corresponding one of the three capacitors and wherein the capacitors are internal to the integrated circuit assembly.

10. The integrated circuit assembly according to claim 9, wherein each controller integrated circuit comprises a power supply for providing operating power to the corresponding controller integrated circuit, the power supply generating a supply voltage of approximately 12 to 15 volts DC and wherein each controller integrated circuit comprises a gate driver circuitry configured to generate drive signals for controlling the gate terminals of the first, second, third and fourth planar transistors wherein the gate drive signals are each limited to approximately 5.5 volts DC.

11. The integrated circuit assembly according to claim 9, wherein the first, second, third and fourth planar transistors comprise high-electron-mobility transistors (HEMTs).

12. The integrated circuit assembly according to claim 9, wherein the first, second, third and fourth planar transistors comprise gallium nitride (GaN) transistors.

13. The integrated circuit assembly according to claim 9, wherein the first, second, third and fourth planar transistors comprise materials selected from the group consisting of silicon carbide, bipolar and germanium semiconductor materials.

14. An integrated circuit assembly comprising:
a monolithic die comprising:
a first planar transistor occupying a first quadrant of the monolithic die, the first planar transistor having a gate, a drain and a source;
a second planar transistor occupying a second quadrant of the monolithic die; the second planar transistor having a gate, a drain and a source;
a third planar transistor occupying a third quadrant of the monolithic die, the third planar transistor having a gate, a drain and a source;
a fourth planar transistor occupying a fourth quadrant of the monolithic die, the fourth planar transistor having a gate, a drain and a source;
a plurality of controller integrated circuits mechanically attached to the monolithic die, the plurality of controller integrated circuits configured to generate drive signals for controlling the gate terminals of the first, second, third and fourth planar transistors, wherein the plurality of controller integrated circuits comprises exactly three controller integrated circuits, including a first controller integrated circuit for controlling the gate of the first planar transistor, a second controller integrated circuit for controlling the gate of the second planar transistor, and a third controller integrated circuit for controlling the gate of the third planar transistor and the gate of the fourth planar transistor, wherein the integrated circuit assembly functions as a bridge rectifier and comprises exactly seven terminals, including two bridge rectifier input terminals, two bridge rectifier output terminals, and three supply terminals, one for each of the three integrated circuit controllers; and
three capacitors wherein each of the three supply terminals is coupled to corresponding one of the three capacitors and wherein the capacitors are internal to the integrated circuit assembly.

15. The synchronous bridge rectifier according to claim 14, wherein each controller integrated circuit comprises a power supply for providing operating power to the corresponding controller integrated circuit, the power supply generating a supply voltage of approximately 12 to 15 volts DC and wherein each controller integrated circuit comprises a gate driver circuitry configured to generate drive signals for controlling the gate terminals of the first, second, third and fourth planar transistors wherein the gate drive signals are each limited to approximately 5.5 volts DC.

16. The synchronous bridge rectifier according to claim 14, wherein the first, second, third and fourth planar switching elements comprise high-electron-mobility transistors (HEMTs).

17. The synchronous bridge rectifier according to claim 14, wherein the first, second, third and fourth planar switching elements comprise gallium nitride (GaN) transistors.

18. The synchronous bridge rectifier according to claim 14, wherein the first, second, third and fourth planar switching elements comprise materials selected from the group consisting of silicon carbide, bipolar and germanium semiconductor materials.

* * * * *